United States Patent [19]

Shuppert et al.

[11] 4,135,960

[45] * Jan. 23, 1979

[54] TOTAL IMAGE TRANSFER PROCESS

[75] Inventors: Laurence V. Shuppert, Neenah; William D. Hanson, Appleton; Robert A. Willer, Neenah, all of Wis.

[73] Assignee: American Can Company, Greenwich, Conn.

[ * ] Notice: The portion of the term of this patent subsequent to Jul. 12, 1994, has been disclaimed.

[21] Appl. No.: 787,525

[22] Filed: Apr. 14, 1977

Related U.S. Application Data

[62] Division of Ser. No. 597,534, Jul. 21, 1975, Pat. No. 4,035,214.

[51] Int. Cl.² .......................... B44C 1/16; B32B 1/10; B41M 1/18

[52] U.S. Cl. ...................................... 156/240; 101/40; 101/175; 101/177; 101/211; 156/241; 156/277; 156/289; 156/315; 427/152; 427/265; 427/266; 427/428

[58] Field of Search ............... 156/238, 240, 277, 231, 156/241, 243, 246, 289, 314, 315, 322; 101/211, 40, 175-177; 113/1 P; 427/152, 207 C, 207 D, 207 B, 261, 265, 266, 428; 428/914, 354, 202

[56] References Cited

U.S. PATENT DOCUMENTS

| | | | |
|---|---|---|---|
| 2,590,538 | 3/1952 | Huck | 101/350 X |
| 3,255,695 | 6/1966 | Johnson et al. | 101/211 |
| 3,554,836 | 1/1971 | Steindorf | 156/240 |
| 3,688,695 | 9/1972 | James | 101/211 |
| 3,731,358 | 5/1973 | Artl | 29/132 |
| 3,907,974 | 9/1975 | Smith | 156/240 X |
| 3,922,435 | 11/1975 | Asnes | 156/240 X |

*Primary Examiner*—William A. Powell
*Assistant Examiner*—Thomas Bokan
*Attorney, Agent, or Firm*—Robert P. Auber; Ira S. Dorman; Harry C. Engstrom

[57] ABSTRACT

Process for transferring overlayed multiple ink patterns from the surface of a release blanket to a receiving surface on a container or other formed article being printed. A substantially transparent film is first formed on the release blanket, with each ink pattern being printed sequentially over this release film. Proper printing on the release film without picking the release film or previously applied ink films is obtained when certain adhesive and cohesive relationships are maintained between the ink films and the release film. An adhesive film may be formed on the article to be printed, or it may be formed over the ink films and the release film on the release blanket. The receiving surface on the article to be printed is brought into contact with the films on the release blanket, with a resulting total transfer of the films on the blanket to the surface of the article.

7 Claims, 1 Drawing Figure

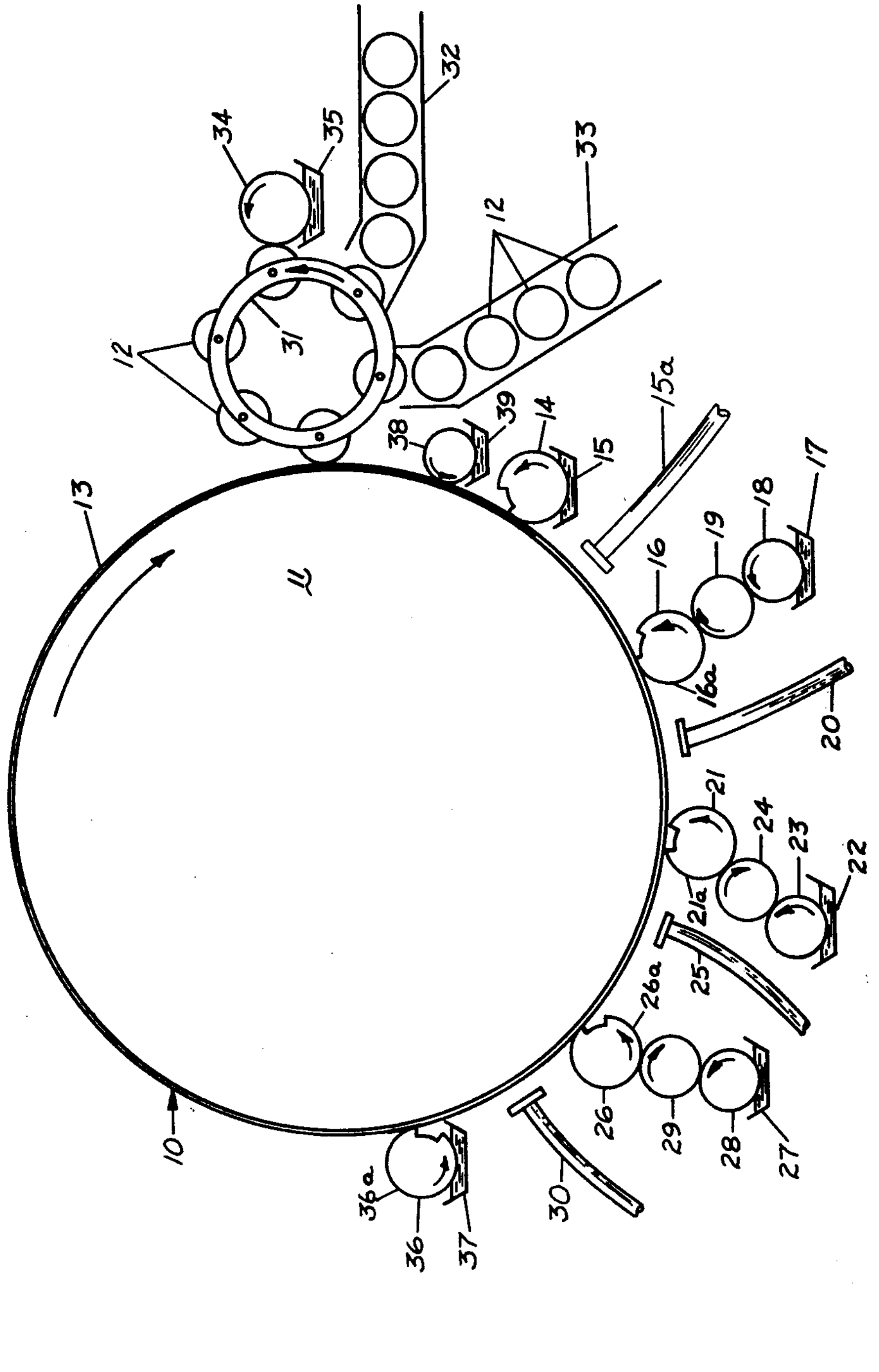
10
11
12
13
14
15
15a
16
16a
17
18
19
20
21
21a
22
23
24
25
26
26a
27
28
29
30
31
32
33
34
35
36
36a
37
38
39

TOTAL IMAGE TRANSFER PROCESS

This is a division of application Ser. No. 597,543, filed July 21, 1975, now U.S. Pat. No. 4,035,214.

BACKGROUND OF THE INVENTION

1. Field of the Invention

This invention pertains generally to processes for the multi-color printing and decorating of formed articles such as pre-formed containers.

2. Description of the Prior Art

Several well-known processes are available for single color printing of articles and containers, including such standard methods as silk screening, direct letterpress printing, transfer applications and offset printing. Direct letterpress printing and conventional lithographic and dry offset printing are particularly useful for the high speed printing of paper webs and sheets which can be moved flat through the letterpress printing press or between the blanket cylinder and impression cylinder of a conventional offset printing press. Multiple colors may be printed on the sheet or web, but this is usually done by applying each color separately to the paper with separate letterpress plates, or with separate blanket cylinders where an offset press is employed.

While the conventional multi-color offset printing process is adequate for the printing of paper webs, it is not well adapted to the printing of formed containers and other articles which cannot be passed flat between the blanket and impression cylinders of the offset press. Examples of such containers and articles are blow molded, thermoformed, or extruded plastic containers, metal cans which are drawn or otherwise formed from a blank, spiral wound composite containers, and glass bottles. Applying multiple ink films to such formed containers by using a plurality of blanket cylinders, each having a separate ink color, is generally not a practical method because of the difficulty of precisely aligning the multiple colored patterns on the article being printed. The necessity of precise registration of the color patterns greatly slows the handling of the articles, while the variations often encountered in the physical dimensions of the articles will result in a high percentage of poorly decorated articles. Similar problems are encountered where multi-color direct letterpress printing of formed articles is attempted.

Other common types of article decorating processes such as silk screening and the application of labels or transfers are excessively expensive for multi-color decoration and often do not provide adequate decoration quality.

Another approach to the multi-color printing of formed containers involves the application of multiple films of ink onto a carrier blanket on a single blanket cylinder by the dry offset printing process, such that the each layer of ink will not be in contact with a layer of ink which is previously or subsequently applied to the blanket. The rubber carrier blanket on the blanket cylinder, with the ink films thereon, may then be placed in printing contact with the article to be printed, with a resulting transfer of the ink films from the blanket surface to the article surface. These ink films will split during transfer, leaving residual ink films on the rubber carrier blanket. Thus, these ink films applied to the blanket must be separated, since if they come in contact with each other, one ink color may be picked up by the plate which prints another ink color onto the blanket. This will result in inks being mixed and distortion of colors. Moreover, if the inks applied to the blanket are fairly thin and have low cohesion, a film of a second ink applied over a first film of ink may split the first film or mix with it. Because the ink films are separated, the resulting printed work does not have the desired degree of sharpness and clarity. In addition, such a technique is obviously not capable of printing multi-color overlapped line images or multi-color halftones.

Attempts have been made to avoid these problems associated with the printing of overlapped colors by selecting the cohesiveness of each layer of ink film such that the films will overlay one another without splitting previous or subsequent layers. This technique does not totally avoid the problem of ink colors migrating onto the printing plate of a different ink color, and it requires complicated printing procedures. Since the multiple layers of ink films have varying cohesive values, each layer of ink film may not split to the same degree upon transfer to the surface being printed. This results in an excess transfer of some ink colors, and an insufficient transfer of other colors.

SUMMARY OF THE INVENTION

We have developed a process for transferring overlayed multiple films of line image or half-tone ink patterns from the surface of a release blanket to a receiving surface on a container or other formed article to be printed. Our process avoids the problem of an ink of one color migrating onto the plate cylinder of a different colored ink, and yet allows for complete and undistorted transfer of the ink films from the surface of the blanket onto the receiving surface of the printed article. The decoration of containers is achieved at lower cost with our process than with most known decoration methods, and extensive modification of standard printing equipment and inks is not required.

Printing of multiple ink colors on a single offset blanket is accomplished by first forming on the surface of a release blanket a release film consisting of a material which will have substantial cohesion after application to the blanket, but which will easily part from the blanket to allow transfer to the receiving surface. The various desired ink patterns are sequentially printed with standard equipment on the release film. After each ink pattern is applied to the release film, it rapidly develops greater cohesiveness so that a subsequent application of a film of ink of another color will neither pick the previous ink film nor mix with it, nor will the previously applied ink film be capable of migrating onto the plate cylinder of the subsequent ink color.

A film of adhesive is applied either to the receiving surface on the article to be printed or over the ink films that have been applied to the release film. If the adhesive film is applied to the article to be printed, the release blanket surface with the release film and the ink films thereon is brought into printing contact with the adhesive film, with the result that the adhesive film pulls the release film and the ink films thereon off of the blanket surface and on to the receiving surface of the article. With the adhesive film applied directly to the ink films and release film, such adhesive film is brought into contact with the surface of the article being printed, with the result that the adhesive film and the release film with the ink films thereon is pulled-off intact from the blanket cylinder and adheres to the surface of the article. Certain adhesive and cohesive relationships between the various films are maintained in order to avoid picking of previously applied films during the application of a subsequent fluid film.

The material comprising the surface of the release blanket and the material forming the release film are chosen to easily part from one another, thus allowing the release film with the printed ink films thereon to completely separate from the blanket and become adhered to the printing surfaces of the articles being printed. The release film also acts as a protective layer over the ink patterns on the printed article, and thus it is preferable that the release film be of a scratch resistant and transparent material.

Further objects, features and advantages of our invention will be apparent from the following detailed description taken in conjunction with the accompanying drawing illustrating preferred embodiments of a total image transfer process exemplifying the principles of our invention.

BRIEF DESCRIPTION OF THE DRAWING

The drawing is a schematic view of printing apparatus utilized in applying our total image transfer process.

DESCRIPTION OF THE PREFERRED EMBODIMENTS

For purposes of illustration, our total image transfer printing process will be described with reference to an offset printing apparatus, shown generally at 10 in the drawing, which has a blanket cylinder 11. However, it will be apparent that our transfer printing process can be effected by other methods well known in the printing industry, as for example, offset printing from an endless transfer sheet which is carried by rollers.

Our total image transfer printing process is well adapted to the printing of formed containers such as those shown schematically at 12 in the drawing. Although a cylindrical container is shown for purposes of exemplification, our transfer process can be utilized with containers having non-circular peripheries. There are numerous containers and other articles which cannot be printed or decorated before they are formed, as indicated above, and in other cases it may be more economical or desirable for other reasons to decorate the containers after they are formed. The nature of the receiving surface to be decorated on such containers is seen to vary widely, and yet it is necessary that any decoration applied to such containers shall adhere strongly to the surface. Our total image transfer printing process allows such strongly adhering transfers to be made without requiring substantial modification of the process to adapt to the receiving surface to be printed.

The blanket cylinder 11 is preferably of the type which comprises a hard metal cylindrical body having a smooth metal peripheral surface, and is mounted for driven rotation in a press frame (not shown). A release blanket 13 is mounted around the periphery of the blanket cylinder 11 in close contact therewith. The release blanket 13 provides a surface from which films formed thereon are transferred to the receiving surface. The release blanket should thus be formed of a material which has good release properties, that is, which allows the release of coatings thereon to be easily accomplished. The release blanket surface should also be capable of being wetted by such coating materials. It is also desirable that the release blanket surface be resistant to abrasion. In general, the best release properties are found in materials which are non-polar and have low surface energy such as polytetrafluoroethylene (Teflon) and silicone elastomer rubbers.

Silicone elastomer rubber (poly-dimethyl siloxane elastomer) is preferred for the release blanket surface since this material provides satisfactory transfer properties and has other characteristic desirable in a release blanket surface. Satisfactory silicone release blankets may be produced by several processes. Thin layered blankets of silicone can be made by whirling the liquid silicone with a sheet aluminum backing in a whirler to produce silicone layers as thin as 0.0005 inch, although most satisfactory transfers have been made with a silicone layer in a standard thickness of 0.007 inch. The silicone applied may be of the self-curing type which cures by reacting with moisture in the air at room temperatures, or it may be of the type that is vulcanized by treatment at high temperatures. Silicone release blankets may also be made by coating silicone over stiff foam plastic, which provides a softer surface for making printing contact with the containers, and thus allows the printing of somewhat more uneven surfaces. The surface layers of silicone, over either the sheet aluminum backing or the foam backing, may be made more resilient by laying down two or more layers of standard thickness silicone. The silicone can also be coated upon conventional rubber lithographic blankets, but some difficulty is encountered because the silicone elastomer to lithographic rubber blanket bond is easily delaminated by common solvents.

A film of release fluid is applied to the release blanket 13 by a release film fluid applicator roller 14 in contact therewith, which picks up release film fluid from a pan 15 mounted below the roller. The applicator roller 14 is rotatably mounted in the press frame, and as shown for illustration, has a gap in its surface so that the release film is applied to the release blanket for a distance corresponding to the desired length of the decoration around the periphery of the containers 12. The release fluid must be capable of wetting and forming a cohesive film on the surface of the release blanket material, and yet be capable of being easily separated intact from the release blanket. This cohesive release film on the release blanket provides a base on which subsequent films of colored inks can be applied, and thus the release film need only be applied to the release blanket 13 in those areas on which subsequent ink films are to be applied. However, the release film also provides other useful functions:

(1) Strength — because of variations in the receiving surface being printed, such as surface pitting, there can be local areas of the surface where physical contact between the release blanket and the receiving surface is not made. Ink by itself is not sufficiently cohesive to stay together over these local depressions, and a continuous ink film will not transfer. The strong cohesive backing provided by the release film holds the ink together and insures continuous solid ink films.

(2) Wettable Surface — It has generally been found that silicone rubbers with good release properties have poor wettability. Commercial flexographic inks, for example, will not consistently form pinhole-free films directly on the release blanket. However, various plastic release films can be cast on the release blanket, with the release film surface then providing a very satisfactory wettable surface for printing.

(3) Abrasion Barrier — The solid particles of pigment in the inks may cause abrasion in a relatively soft release blanket, such as one made with silicone elastomer. The pigment-free plastic release film forms a barrier between the pigment in the ink and the release blanket itself.

(4) Decoration Protection — After transfer of the films on the release blanket onto the printing surface, the release film becomes the outside film on the decorated container. The plastic release film can be utilized to provide protection for the inks underneath and for the container itself, and can be selected to provide the desired finish, such as a satin finish or a medium gloss finish. It is thus often desirable to have the release film cover the entire surface of the container rather than just those areas where ink films are to be applied. The release film must also be substantially transparent or translucent to expose the printed patterns beneath it.

Since the release blanket-release film combination is chosen to separate easily, it may also be susceptible to damage by tacky ink. A "pick" test can be made to determine the resistance of various release films to cracking and destruction by ink on flexographic printing plates. A pick test number can be determined as the highest inkometer tack rated ink that can be brayed on from an ink applying surface without disturbing or picking off the release film. The results of a pick test with various release film materials on a silicone rubber blanket is shown in Table I below, wherein inks of inkometer tack 5.0, 6.4, 8.2, 11.6, and 13.0 were used in the test. In general, higher pick test numbers indicate greater internal cohesion of the release film and a greater adhesion of the release film to the release blanket. Although increased pick resistance is desirable, the cohesion of the release film preferably will always be greater than the adhesion of the release film to the release blanket to insure that the release film can separate from the blanket without splitting.

TABLE I

| Material | Pick Value | Weight (Lbs./ream) |
|---|---|---|
| Polyurethane in methyl ethyl ketone | less than 5.0 | 1.79 |
| 50% nitrocellulose and 50% polyurethane in isopropyl acetate | 5.0 | 1.87 |
| Vinyl chloride-acetate copolymer in isopropyl acetate | 6.4 | 1.18 |
| Styrene in methyl ethyl ketone | 5.0 | 1.8 |
| Styrene-butadiene copolymer in isopropyl acetate | 5.0 | 1.02 |
| Styrene-butadiene copolymer in toluene | 8.2 | 1.11 |
| Styrene-butadiene copolymer in methyl ethyl ketone | 13.0 | 1.0 |
| Styrene-butadiene copolymer in ethyl acetate | 13.0 | 0.93 |

Generally, a heavy release film is more desirable than a light or thin film, with one pound of release fluid material per ream of printing surface or more being preferable, and direct rotogravure or silk screen application is required to obtain this weight. The weight per ream shown in Table I was obtained utilizing a rotogravure cylinder for application of the release film. A metal rotogravure cylinder, such as a steel cylinder, allows greater flexibility in the choice of a release fluid solvent than rubber or plastic rollers.

The release film materials shown in Table I are illustrative of film forming materials which have satisfactory release properties when used with a silicone rubber blanket. However, the release film can be formed from numerous other suitable solvent cast film forming materials having the desired release properties, as for example, polyvinylidene chloride, polyvinyl chloride, and butyl methacrylate. Materials containing chlorine may have undesirable characteristics for purposes of recycling, since these substances tend to form hydrochloric acid in the extruders. If the release film is to be solvent cast, the solvent must have a fast drying rate and a low surface tension in order to aid the formation of a continuous film on the silicone release blanket. In addition, they must dissolve the polymer release film material and yet not damage the silicone elastomer blanket. The solvents used may also change the release properties of the silicone blanket. Of course, all of these solvent based materials should dry to substantially a solid state after application to the container surface. Hot air may be applied to the solvent cast release film from a blower pipe 15a to accelerate the drying of the release film with a consequent increase in cohesion of the film.

More generally, the release film can be formed of any film forming material which has the desired cohesiveness at the time that the ink films are applied, and which is capable of releasing properly from the release blanket. For example, a hot melt of ethylene vinyl acetate or other thermoplastic may be applied to the release blanket, with the film acquiring cohesiveness as it cools. Various types of ultra-violet light curable fluids or varnishes can be used as release film material, with a thin coat of the material being applied to the release blanket in a liquid state, the release film becoming polymerized and thus acquiring the necessary cohesiveness by the action of ultra-violet light applied thereto before the ink films are imprinted thereon. Various types of water base emulsions may also be used as the release coat, with the water being driven off by hot air applied to the emulsion release film before the ink films are applied thereto.

After the release film has been applied to the blanket surface, the inks may be applied to the surface of the release film in a manner analogous to the standard direct printing process. As shown for illustrative purposes in the drawing, a first film of ink defining a pattern or image is applied by a first ink applicator plate cylinder 16 carrying a plate 16a having an ink applying surface which is provided with ink from an ink fountain pan 17 through an ink fountain roller 18 and a transfer roller 19, with each roller being revolvably mounted in the press frame (not shown). The two ink rollers 18 and 19 are shown as typical of ink supply systems, and other well known ink supply and distribution systems may be employed as desired. In order to apply a continuous ink film and to prevent picking of the release film by the ink film layed down by the ink applying surface of the first ink applicator cylinder 16 (usually the yellow ink in process printing), it is necessary that ink fluid be capable of wetting the release film and that the cohesion of the ink, at the time of application, be less than all of the following: (1) the adhesion of the release film to the blanket surface, (2) the adhesion of the release film to the ink film, and (3) the cohesion of the release film. In addition, to insure a split of ink between the ink applying surface of the plate 16a and the release film, the cohesiveness of the ink film must be less than the adhesion of the ink applying surface of the ink applicator plate to the ink film itself. The cohesion of the ink film must be less than the adhesion of the release film to the blanket surface to prevent the ink from pulling the release film off the blanket. The adhesion of the ink to the release film must be greater than the cohesion of the ink to provide proper transfer of an ink split to the release film. The cohesion of the release film must be greater than that of the ink at the time of application of the ink so that the release film is not pulled apart by the ink being applied by the ink applying surface of the plate 16a. As discussed above, the release film is capable of increasing in cohesion (by evaporation if solvent cast) after it is applied, and thus it is not necessary that the cohesion of the release film fluid be greater than the cohesion of the inks until the time that the inks are applied to the release film.

It is highly desirable that the first ink film after application be very cohesive, and in fact substantially dry before the next ink film is applied, so that the overprinted colored inks do not mix. Drying of the ink films also can increase the adhesion of the ink to the release film. If the ink is made with a volatile solvent that evaporates rapidly, the speed of rotation of the blanket cylinder 11 may be adjusted so that the inks will dry satisfactorily by evaporation between successive ink film applications. The drying of the ink may be accelerated by providing heat to the blanket cylinder 11 internally, or by applying hot air through a blower pipe 20 from a heater (not shown) to the ink film on the surface of the blanket to cause rapid drying of the ink. An oven (not shown) can also be utilized to heat the surface of the release blanket externally.

A second ink applicator plate cylinder 21 carrying a plate 21a having an ink applying surface is provided with ink from a fountain pen 22 through an ink fountain roller 23 and a transfer roller 24. These rollers are revolvably mounted in the press frame (not shown), and as noted above, may be replaced by other ink distribution systems. In typical process printing, the ink applicator cylinder 21 would be applying a red colored ink film pattern over the pattern made by the first ink film. Of course, it is necessary that the pattern applied by the ink applying surface of the second applicator cylinder 21 register precisely as desired with the images previously applied by the first ink applicator cylinder 16. Since the ink applied by the ink applying surface of the cylinder 21 will be applied over the previous film of ink, it is necessary, to prevent picking of the release film and previously applied ink film, that the cohesion of the second film of ink at the time of application be less than all of the following: (1) the cohesion of the first film of ink at that time, (2) the adhesion of the first film of ink to the release film, (3) the adhesion of the first film of ink to the second film of ink, and (4) the adhesion of the release film to the blanket surface. The second ink fluid must also be capable of wetting the release film. To insure an ink split between the release film and the ink applying surface of the applicator plate 21a, the cohesion of the second ink film fluid should be less than the adhesion of the ink to the applicator plate. Again, the cohesion of the second film of ink may be increased after application by accelerated drying, for example, by means of heating the blanket cylinder, or by utilizing a second blower pipe 25 which applys hot air to the second film of ink on the blanket surface.

A third film of ink defining an additional pattern, the blue ink in the usual process printing, is then applied by an ink applicator plate cylinder 26 carrying a plate 26a having an ink applying surface, which is supplied with ink from a fountain pan 27 through an ink fountain roller 28 and a transfer roller 29. These rollers are also revolvably mounted in the press frame and may be replaced by other ink distribution systems. Since the third ink film being applied by the ink applying surface on the third ink applicator cylinder 26 will be applied over the previous ink films and the release film, it is necessary, to prevent picking of the release film, and previously applied ink films, that the cohesion of the third ink film at the time of application be less than all of the following: (1) the adhesion of the previous ink films to the release film, (2) the adhesion of the third ink film to the previously applied first and second ink films, (3) the cohesion of all previously applied ink films (and the release film), and (4) the adhesion of the release film to the blanket surface. The third ink fluid must be capable of wetting the release film to allow a proper ink film to be formed. It is also desirable that the cohesion of the ink be less than its adhesion to the ink applying surface of the applicator plate 26a. Again, a blower pipe 30 may be provided to apply hot air from a heater (not shown) to the third ink film to accelerate drying thereof, or such drying may be achieved by heating the surface of the release blanket.

Additional ink films, such as the black ink in "four color" printing, may be applied in the manner specified above for the previous ink colors. Any additional ink films must also satisfy the adhesion-cohesion relationships described above.

The ink films are preferably applied to the release film with a raised ink applying surface such as the printing surfaces of a flexographic or letter press plate. If a flat plate is used, such as a rotogravure or a lithographic plate, some of the release film may transfer to the plate in the non-image areas. Hard metal and plastic plates have a tendency to form sharp corners on the edge of the raised printing areas which may cut the release film. If the release film is cut, the result is distortion of the image on transfer to the receiving surface on the container. Rubber flexographic plates have been found to be the most satisfactory for printing on the release film.

Standard flexographic inks are very thin, low viscosity inks, and at the time of transfer to the blanket they have very low cohesion (if they have not already dried appreciably), and thus will not damage the release film. Before an additional film of ink is laid down over the previously applied film, the previous film of ink must develop sufficient cohesion and adhesion to the release film such that it will not be split or pulled off the release film onto the ink applying surface plate which is printing the second film of ink. In such wet inks were allowed to mingle, inks of varying colors would be found on the same printing plate, with the result that the printing would be smeared and completely unacceptable. Thus, each film of ink must be capable of drying very rapidly after it is placed on the release film and before the next film of ink is applied. The speed of rotation of the blanket cylinder may be adjusted to insure that previously applied inks have dried adequately before additional inks are applied. As indicated above, this drying process may be speeded up by applying heat in the form of an oven through which the ink passes, or by dryers which blow hot air onto the ink surface, or by internally heating the surface of the blanket cylinder.

Inks which acquire cohesion by means other than evaporation may also be used with our process. For example, the inks may be ultra-violet light curable, with ultraviolet light being applied to the blanket surface between ink applicator cylinders. Heat setting inks may also be used. It is also possible to avoid picking of previously applied ink films by decreasing the cohesion of each subsequently applied ink fluid. For example, a styrene-butadiene copolymer release film could have a first ink fluid with an inkometer tack of 13 applied to it by the dry offset process. A second color ink with a tack of 11 could be printed over the first ink film, and a third color ink with a tack of 9 could be printed over both previously applied ink films.

Standard polyamide base and nitrocellulose base flexographic inks are well adapted for use with our total image transfer process. However, the drying rate of commercially available inks must actually be slowed down to prevent their drying appreciably and developing excessive cohesion before they come into contact with the release film. This may be accomplished by adding butyl cellosolve or cellosolve acetate or another lower volatility solvent to these inks in an amount sufficient to prevent substantial drying before the ink film is applied, but which will still allow the inks to dry rapidly to the desired degree of cohesion before another film of ink is applied thereover.

In order to obtain satisfactory transfer of the ink films and the release film from the blanket 13 to a wide variety of receiving surfaces, we have found that it is necessary to provide an adhesive film which will pull the films onto the receiving surface of the article 12. This adhesive film may be applied directly over the release film and the ink films that are on the release blanket 13, or the adhesive film may be applied to the receiving surface to be printed on the article 12 before this surface is brought into printing contact with the films on the blanket surface. As shown in the drawing, the containers 12 are preferably brought into printing contact with the release blanket 13 by means of a star-wheel feeding device shown schematically at 31, with the undecorated containers being brought in through an infeed chute 32, and with the fully decorated containers being removed through an exit chute 33. A chuck (not shown) is provided in the feeding device 31 to grasp the containers 12 and support them with free rotation for printing. The containers may also be supported for printing by our process by air inflation, since only light contact between the container surface and the films on the blanket surface is necessary to effect satisfactory transfer. The receiving surface of the container makes rolling printing contact with the films on the release blanket with the result that the films completely transfer to the receiving surface. If the adhesive film is to be applied directly to the receiving surface of the containers 12, an adhesive applicator roller 34 is used which picks up adhesive fluid directly from a pan 35, and applies this fluid to the receiving surface of the container by making rolling contact therewith. It is apparent that the adhesive film may be applied by other methods, including spraying the adhesive fluid onto the receiving surface, or applying the fluid by gravure offset.

The feeding device 31 brings a container with an adhesive film thereon into rolling contact with the films on the release blanket. The contact pressure between the blanket surface and the container receiving surface must be sufficient to cause the adhesive film to adhere to the ink films and release film more strongly than the release film adheres to the release blanket, but the pressure should not be so excessive as to cause extreme compression of the films. As the blanket cylinder and container rotate, a slightly flattened portion of the films on the release blanket surface come into contact with the adhesive film to cause adhesion therebetween. As the blanket cylinder and container continue to rotate, the silicone release surface of the blanket carrying the portion of the release and ink films in contact with the adhesive film is drawn apart from the receiving surface, with the result that the release and ink films transfer completely from the release surface and remain adhered to the container receiving surface. The container is moved away from the blanket after transfer of the films to the container surface has been completed.

Alternatively, the adhesive may be provided by an adhesive applicator cylinder 36 carrying a plate 36*a* having an adhesive applying surface which is supplied with adhesive fluid from a pan 37, and which applies the adhesive fluid film directly to the ink films on the release blanket 13. After the adhesive film is applied over the other films on the blanket, it is brought into contact with the receiving surface on the container, with a resulting continuous transfer of those portions of the films in contact with the container as the blanket cylinder continues to rotate and draw apart the corresponding portions of the release surface of the blanket and the receiving surface. The contact pressure must be sufficient to provide greater adhesion between the adhesive film and the receiving surface than the adhesion between the release film and the release blanket surface. To assure a proper application of adhesive film from the adhesive applying surface to the films on the release blanket without picking the release film and ink films, it is necessary that the cohesion of the adhesive film at the time of application be less than all of the following: (1) the cohesion of the last film of ink applied, (2) the adhesion of the last film of ink applied to all previously applied films of ink, (3) the adhesion of the last film of ink applied to the adhesive film itself, and (4) the adhesion of the release film to the surface of the blanket. Of course, the adhesion of the adhesive to the ink films and the receiving surface must be greater than the adhesion of the release film to the blanket surface.

The adhesive film insures that total transfer of all the films on the blanket will occur, and it provides a strong bond between the ink and release films and the surface of the container. Moreover, the adhesive film covers over depressions and irregularites in the receiving surface on the container and allows complete transfer to be made over these surfaces.

One of the primary characteristics that a satisfactory adhesive must possess is good green tack—that is, it will preferably develop maximum tack immediately after it is applied to the surface. The adhesive must also be capable of solidifying or drying after application to the containers. Various types of adhesives, including polyurethane tackified rubbers and acrylic base adhesives, have these desirable characteristics. The adhesive may be directly applied with a rotogravure system since the rotogravure cylinder allows an even coat of adhesive to be applied without stringing or sticking, and a metal gravure cylinder is resistant to the solvents used to cast the adhesives. Where the adhesive film is to be formed on the receiving surface of the container, the adhesive fluid can be applied by a gravure roller to a soft rubber offset roller which transfers the adhesive to the surface of the container. Such a soft rubber offset roller is capable of thorough contact with an uneven container surface. Other adhesives such as water base emulsion adhesives and pressure sensitive adhesives may also be employed as desired, provided that they have the proper adhesion and cohesion characteristics noted above. It is apparent that virtually any type of receiving surface, including glass, paperboard and metal, may be decorated in accordance with our process by use of an adhesive which will adhere satisfactorily to both the receiving surface and the ink films.

The useful life of the release blanket can be substantially extended by coating the surface of the release blanket with a lubricating film of silicone oil, polydimethyl siloxane. The silicone oil lubricating fluid refreshes the surface of the blanket and acts as a lubricant to prevent abrasion of the blanket surface by contaminants in the release film, and also acts to enhance the release properties of the blanket itself. The silicone oil lubricant may be applied to the release blanket 13 before application of the release film by means of a lubricating fluid applicator roller 38. The applicator roller 38 may pick up lubricating fluid from a pan 39, as shown in the drawing, or the fluid may be sprayed or wiped onto the surface of the release blanket.

The following examples are provided as illustrative of our invention.

EXAMPLE 1

A release blanket was made by coating an aluminum sheet in a whirler with a layer of silicone elastomer rubber (Dow-Corning 236 dimethyl siloxane elastomer) which is self-curing at room temperature. The average thickness of the silicone elastomer layer was 0.007 inch. The release blanket was mounted on a steel blanket cylinder in close contact therewith.

The release film fluid was formed by mixing 90% by weight "Elvacite 2044" (a butyl methacrylate resin marketed by Du Pont) with 10% by weight nitrocellulose, and dissolving the mixture in a solvent of n-propyl acetate, with the solvent being added in an amount sufficient to adjust the viscosity of the solution to 15 seconds on a No. 3 Shell Cup (20 centipoise). This viscosity allowed a satisfactory film of release fluid to be formed on the release blanket surface. The release film fluid was cast onto the surface of the release blanket with a steel rotogravure cylinder. Air at a temperature of 180° F. was applied to the release film to accelerate drying, with sufficient cohesion being developed in approximately 0.02 seconds to allow application of ink films to the release film.

Standard polyamide base inks available from the M & T Chemical Company were applied onto the release film formed on the release blanket, with overlapping three color line patterns being formed by contact between the release film and the raised surface of successive flexographic printing cylinders bearing the desired pattern for each color. A 0.002" squeeze at the nips between the printing cylinders and the blanket cylinder provided satisfactory printing on the release film. The drying rate of the inks was slowed down by the addition of butyl cellosolve to the inks in an amount sufficient to insure that the ink had low cohesiveness when first contacting the release film and thus would not pick the release film and previously applied ink films, but dried rapidly enough so that the ink film layed on was sufficiently dry before the next film of ink was applied. The ink fluids at the time of application had a viscosity of approximately 20 centipoise with an inkometer tack of less than 1.0. Heated air at a temperature of 180° F. was applied to the ink films between printing rollers to accelerate drying, with the ink films acquiring adequate cohesion in approximately 0.01 second to allow printing of subsequent ink films thereon.

A polyurethane base adhesive available from Polymer Industries under the name "Unoflex T" was applied by a steel rotogravure cylinder to the receiving surface on formed containers made of a polypropylene-polyethylene copolymer plastic. The containers, with the adhesive film thereon, were then brought by free rotating mandrel support into printing contact with the films on the release blanket, with a resulting complete transfer of the films to the container. A methyl ethyl ketone solvent was added to the adhesive in an amount sufficient to adjust the viscosity of the solution to 20 seconds on a No. 3 Shell Cup (29 centipoise).

The viscosity value for each film forming fluid is chosen to allow the fluids to satisfactorily form films after application. Because the release film and adhesive films are applied with rotogravure cylinders, excess viscosity will cause the film to "screen" because there will be insufficient flow to fill in the areas corresponding to the bridges or gaps between the cells of the rotogravure cylinder surface. If the viscosity is too low, the film may "de-wet" or bead-up on the release blanket surface. The viscosity of the inks were adjusted for best print quality and to avoid picking of the release film by the inks.

EXAMPLE 2

A release blanket was made by coating an aluminum sheet in a whirler with a layer of silicone elastomer available from Dow-Corning under the name "Silvercone", with the average thickness of the silicone elastomer layer being 0.0625 inch. The silicone layer was cured by high temperature vulcanization, and the release blanket was mounted on a steel blanket cylinder.

The release film fluid consisted of "Bakelite VMCH" (a Union Carbide name for a vinyl chloride-acetate copolymer) dissolved in a solvent of isopropyl acetate. The solvent was added in an amount sufficient to adjust the viscosity of the solution to 15 seconds on a No. 3 Shell Cup (20 centipoise), which provided satisfactory cohesion. The release film fluid was cast onto the surface of the release blanket with a steel rotogravure cylinder and had heated air at a temperature of 180° F. applied thereto to allow the release film to acquire satisfactory cohesiveness within approximately 0.02 second.

Multiple films of nitrocellulose base flexographic printing inks of red, yellow, and blue colors were applied sequentially to the release film on the blanket by standard flexographic printing cylinders, with a 0.002" squeeze being provided at the nips between the printing cylinders and the blanket cylinder. The flexographic plates provided a halftone pictorial pattern for each ink color. Heated air at a temperature of 180° F. was directed over the ink films after they were applied on the release film to accelerate the drying of the inks before application of the next film of ink. Satisfactory ink cohesion was obtained within approximately 0.01 second. Cellosolve acetate was added to the inks in an amount sufficient to insure that the ink had a low cohesiveness when first contacting the release film so as to avoid picking the release film and previously applied ink films, but was capable of being dried rapidly thereafter upon application of the heated air. At the time of application, the ink fluids had a viscosity of approximately 20 centipoise, and an inkometer tack of less than 1.0.

The adhesive used was an acrylic base adhesive available from the Ashland Chemical Company under the name "Aroset 1539". This adhesive was applied with a rotogravure cylinder to the receiving surface of preformed polypropylene-polyethylene plastic containers, and the containers with the adhesive film thereon were placed in printing contact with the films on the blanket cylinder. The films on the blanket surface adhered to the adhesive film and transferred completely to the surface of the formed container. The adhesive was adjusted to a viscosity of 20 seconds on a No. 3 Shell Cup (29 centipoise) with a solvent of ethyl acetate.

EXAMPLES 3 and 4

Transfers of ink films to formed plastic containers were made in the manner given above for Examples 1 and 2 except that a thin lubricating coat of Dow-Corning "DC-200" silicone oil lubricating fluid was applied to the release blanket before the release film was cast thereon. The lubricating fluid was applied with a rotogravure cylinder knurled to 550 lines per inch. The application of the lubricating fluid allowed decoration of several hundred containers in a continuous run without damage to the release blanket or loss of its release properties.

EXAMPLE 5

A silicone elastomer release blanket of the type described above in Example 1 was utilized.

The release film fluid consisted of a styrene-butadiene copolymer available from the Shell Chemical Company under the name "Kraton 1102". An ethyl acetate solvent was added to the styrene-butadiene copolymer in an amount sufficient to yield a viscosity of 15 seconds on a No. 3 Shell Cup (20 centipoise). The release film fluid was applied to the surface of the release blanket with a rotogravure cylinder.

The ink films and adhesive film were formed and applied as described above in Example 1, and total transfer of the ink films and release film to the surface of formed polypropylene-polyethylene plastic containers was obtained.

It is understood that our invention is not confined to the particular embodiments described herein as illustrative of our invention, but embraces all such modified forms thereof as may come within the scope of the following claims.

We claim:

1. A process for multicolor printing of an article by transferring multiple ink films simultaneously to a receiving surface on an article to be printed, comprising the steps of:

(a) applying a substantially transparent film forming release fluid in a film onto a release surface of a continuously rotating release blanket, said release fluid being capable of wetting said release surface and of increasing its own cohesion after application thereof;

(b) applying from an ink applying raised pattern surface of a flexographic applicator plate a first film forming flexographic ink fluid of a first color in a film defining a pattern onto said release film on said release surface, said ink fluid being capable of wetting said release film and being capable of being applied from said ink applying surface to said release film without picking said release film;

(c) applying from an ink applying raised pattern surface of a flexographic applicator plate at least one additional film forming flexographic ink fluid in a film defining a pattern onto said release film and over all previously applied ink films including said first ink film, each said additional ink film being of a different color than all previously applied ink films, and each said additional ink film being capable of wetting said release film and being capable of being applied from said ink applying surface without picking said release film and said previously applied ink films;

(d) applying an adhesive fluid in a film to the receiving surface, said adhesive fluid film providing adhesion by contact pressure and being capable of having greater adhesion to said ink films and said release film and to said receiving surface than the adhesion of said release film to said release surface;

(e) contacting at least a portion of said release film and said ink films on said release surface with said adhesive film on the receiving surface to provide greater adhesion of said ink films and said release film and said receiving surface to said adhesive film than the adhesion of said release film to said release surface; and (f) drawing apart said release surface and the receiving surface whereby said portion of said ink films and said release film which are in contact with said adhesive film adhere intact to said adhesive film on the receiving surface with resulting total transfer of the films on said release surface to the receiving surface.

2. The process as specified in claim 1 wherein:

(a) the cohesion of said first ink film fluid at the time of application is less than the adhesion of said release film to said release surface, less than the adhesion of said release film to said first ink film, and less than the cohesion of said release film, whereby said first ink fluid film is applied without picking said release film, said first ink film being capable of increasing its cohesion after application thereof, and (b) each of said additional ink film fluids having cohesion at the time of application thereof that is less than the cohesion of all previously applied ink films at that time, less than the adhesion of all previously applied ink films to said release film, less than the adhesion of said additional ink film to all previously applied ink films and said release film, and less than the adhesion of said release film to said release surface, whereby each said additional ink fluid film is applied without picking said release film and said previously applied ink films, each said additional ink film being capable of increasing its cohesion after application thereof.

3. The process as specified in claim 1 wherein said release fluid consists essentially of a solution of a polymer material and a solvent base and wherein said release fluid film increases its cohesion by evaporation of said solvent base.

4. The process as specified in claim 1 wherein said release surface consists of a poly-dimethyl siloxane elastomer.

5. The process as specified in claim 1 including the step of applying a silicone oil lubricant in a thin film to said release surface and wherein said release fluid film is applied over said silicone oil film on said release surface.

6. The process as specified in claim 1 wherein a solvent selected from the group consisting of butyl cellosolve and cellosolve acetate is added to said inks in an amount sufficient to inhibit drying of said inks until they are applied to said release fluid film while allowing said inks to dry quickly after application to said release film and develop increased cohesion.

7. The process as specified in claim 1 including the step of applying heat to each ink film after it is applied to said release film to cause each said ink film to dry substantially and develop increased cohesion before application of a subsequent fluid film thereto.

* * * * *